United States Patent
Piradi et al.

(10) Patent No.: US 12,522,372 B2
(45) Date of Patent: Jan. 13, 2026

(54) SYSTEMS AND METHODS FOR INCREASING FUEL EFFICIENCY FOR AN AIRCRAFT

(71) Applicant: THE BOEING COMPANY, Arlington, VA (US)

(72) Inventors: Prasad Rao Piradi, Karnataka (IN); Gurender Singh, Karnataka (IN)

(73) Assignee: The Boeing Company, Arlington, VA (US)

(*) Notice: Subject to any disclaimer, the term of this patent is extended or adjusted under 35 U.S.C. 154(b) by 176 days.

(21) Appl. No.: 18/466,067

(22) Filed: Sep. 13, 2023

(65) Prior Publication Data

US 2025/0083832 A1    Mar. 13, 2025

(51) Int. Cl.
*B64D 43/02* (2006.01)
*G05D 13/62* (2006.01)

(52) U.S. Cl.
CPC .............. *B64D 43/02* (2013.01); *G05D 13/62* (2013.01)

(58) Field of Classification Search
CPC ........ B64D 43/02; G05D 13/62; G05D 1/644; G05D 2107/13; G05D 2109/22; G05D 1/65
See application file for complete search history.

(56) References Cited

U.S. PATENT DOCUMENTS

| | | | | |
|---|---|---|---|---|
| 4,161,299 A * | 7/1979 | Smisson | ................. | B64D 43/00 73/180 |
| 4,325,123 A * | 4/1982 | Graham | ................. | G05D 1/0005 701/123 |
| 4,750,127 A * | 6/1988 | Leslie | ................. | G08G 5/54 701/16 |
| 4,760,530 A * | 7/1988 | Liden | ................. | G05D 1/0005 700/36 |
| 4,774,670 A * | 9/1988 | Palmieri | ................. | G05D 1/101 701/465 |
| 4,827,417 A * | 5/1989 | Berger | ................. | G05D 1/0005 701/5 |
| 5,023,797 A * | 6/1991 | Lappos | ................. | G05D 1/0005 701/99 |
| 5,121,325 A * | 6/1992 | DeJonge | ................. | G05D 1/0005 701/123 |
| 5,408,413 A * | 4/1995 | Gonser | ................. | G05D 1/0005 701/123 |
| 6,061,612 A * | 5/2000 | Sainthuile | ................. | G05D 1/0005 73/178 R |
| 6,078,850 A * | 6/2000 | Kane | ................. | G06Q 50/06 700/282 |
| 6,266,610 B1 * | 7/2001 | Schultz | ................. | G05D 1/1062 701/533 |

(Continued)

OTHER PUBLICATIONS

ATM concept integrating trajectory-orientation and airborne separation assistance in the presence of time-based traffic flow management Conference Paper • Nov. 2003.

(Continued)

*Primary Examiner* — Bhavesh V Amin
(74) *Attorney, Agent, or Firm* — Joseph M. Butscher; The Small Patent Law Group LLC

(57) ABSTRACT

A system and a method include a control unit configured to receive data regarding an aircraft, and determine, based on the data, one or more economy speeds for the aircraft to fly between a departure airport and an arrival airport.

20 Claims, 6 Drawing Sheets

(56) References Cited

U.S. PATENT DOCUMENTS

| | | | | |
|---|---|---|---|---|
| 6,507,782 | B1* | 1/2003 | Rumbo | G05D 1/0005 701/123 |
| 7,283,895 | B2* | 10/2007 | Bouchet | G08G 5/53 701/3 |
| 7,437,225 | B1* | 10/2008 | Rathinam | G05D 1/0005 342/36 |
| 7,606,641 | B2* | 10/2009 | Allen | G08G 5/26 701/123 |
| 7,623,960 | B2* | 11/2009 | Wise | G05D 1/106 340/978 |
| 7,647,163 | B2* | 1/2010 | Allen | G01C 23/005 701/123 |
| 7,676,303 | B2* | 3/2010 | Hanel | G05D 1/0816 701/2 |
| 7,711,457 | B2* | 5/2010 | Caillaud | G08G 5/34 701/16 |
| 7,797,102 | B2* | 9/2010 | Fortier | G08G 5/53 701/123 |
| 7,818,118 | B2* | 10/2010 | Ivansson | G05D 1/0223 73/488 |
| 7,835,825 | B2* | 11/2010 | Coulmeau | G08G 5/727 701/13 |
| 7,904,213 | B2* | 3/2011 | Coulmeau | G08G 5/34 244/175 |
| 7,945,354 | B2* | 5/2011 | Boorman | G08G 5/21 701/4 |
| 8,010,242 | B1* | 8/2011 | Ginsberg | G08G 5/32 701/3 |
| 8,010,267 | B2* | 8/2011 | Klooster | G08G 5/53 701/121 |
| 8,332,145 | B2* | 12/2012 | Dacre-Wright | G08G 5/22 701/465 |
| 8,340,843 | B2* | 12/2012 | Coulmeau | G08G 5/56 701/4 |
| 8,386,097 | B2* | 2/2013 | de Menorval | G05D 1/0005 340/978 |
| 8,430,360 | B2* | 4/2013 | Schwarze | F02C 9/40 244/135 C |
| 8,437,887 | B2* | 5/2013 | Coulmeau | G06Q 10/04 701/4 |
| 8,509,968 | B1* | 8/2013 | Saccone | G05B 13/0205 342/36 |
| 8,565,938 | B2* | 10/2013 | Coulmeau | G05D 1/0005 701/120 |
| 8,583,352 | B2* | 11/2013 | Klooster | G08G 5/54 701/120 |
| 8,600,675 | B1* | 12/2013 | Borghese | G05D 1/0005 701/528 |
| 8,639,401 | B2* | 1/2014 | Bailey | G08G 5/53 701/2 |
| 8,676,403 | B2* | 3/2014 | Garrido-Lopez | G05D 1/101 244/175 |
| 8,694,234 | B2* | 4/2014 | Mere | G05D 1/0005 701/123 |
| 8,744,768 | B2* | 6/2014 | Gutierez-Castaneda | G16Z 99/00 340/978 |
| 8,768,607 | B2* | 7/2014 | Righi | B64D 37/00 701/1 |
| 8,798,831 | B2* | 8/2014 | Cho | B60L 58/12 180/65.21 |
| 9,087,450 | B2* | 7/2015 | Hedrick | G08G 5/32 |
| 9,494,945 | B2* | 11/2016 | Coulmeau | G08G 5/34 |
| 9,540,005 | B1* | 1/2017 | Howe-Veenstra | G01C 21/20 |
| 9,567,097 | B2* | 2/2017 | Horsager | B64D 45/00 |
| 9,709,992 | B2* | 7/2017 | Hedrick | G08G 5/55 |
| 9,745,052 | B2* | 8/2017 | Lax | G06Q 10/06 |
| 9,911,339 | B2* | 3/2018 | Lax | G08G 5/34 |
| 9,947,231 | B2* | 4/2018 | Garrido Lopez | G08G 5/55 |
| 10,013,236 | B2* | 7/2018 | Bailey | G08G 5/55 |
| 10,071,818 | B2 | 9/2018 | Kim | |
| 10,144,505 | B2* | 12/2018 | Kim | G08G 5/34 |
| 10,325,504 | B2* | 6/2019 | Meier | B64D 43/02 |
| 10,388,170 | B2* | 8/2019 | De Villele | G08G 5/55 |
| 10,528,043 | B2* | 1/2020 | O'Laughlin | G08G 5/21 |
| 10,546,260 | B2* | 1/2020 | Liao | G07C 5/02 |
| 10,665,114 | B2* | 5/2020 | Irrgang | G08G 5/34 |
| 10,877,952 | B2 | 12/2020 | Kim | |
| 11,120,694 | B2* | 9/2021 | Melendez | G01C 23/00 |
| 11,262,746 | B1* | 3/2022 | Van Duren | B64U 20/80 |
| 11,518,546 | B2 | 12/2022 | Sadhu | |
| 2003/0093219 | A1* | 5/2003 | Schultz | G08G 5/76 701/533 |
| 2006/0025898 | A1* | 2/2006 | Charles | G05D 1/0061 701/9 |
| 2007/0078573 | A1* | 4/2007 | Ivansson | G05D 1/0223 701/14 |
| 2007/0150178 | A1* | 6/2007 | Fortier | G08G 5/53 701/467 |
| 2008/0039984 | A1* | 2/2008 | Bitar | G01C 21/20 701/3 |
| 2008/0103646 | A1* | 5/2008 | Lucas | G08G 5/54 244/76 R |
| 2008/0228333 | A1* | 9/2008 | De Menorval | G08G 5/55 701/14 |
| 2008/0300737 | A1* | 12/2008 | Sacle | G01C 23/005 701/3 |
| 2008/0300738 | A1* | 12/2008 | Coulmeau | G05D 1/0005 701/3 |
| 2008/0306638 | A1* | 12/2008 | Gutierrez-Castaneda | G08G 5/54 701/3 |
| 2008/0312776 | A1* | 12/2008 | Sylvester | G01C 23/00 701/3 |
| 2008/0312779 | A1* | 12/2008 | Sacle | G01C 23/005 701/7 |
| 2009/0082955 | A1* | 3/2009 | Sacle | G08G 5/21 701/467 |
| 2010/0152930 | A1* | 6/2010 | Coulmeau | G05D 1/0202 701/7 |
| 2010/0198433 | A1* | 8/2010 | Fortier | G08G 5/34 701/14 |
| 2011/0118908 | A1* | 5/2011 | Boorman | G08G 5/55 701/14 |
| 2011/0137493 | A1* | 6/2011 | Dacre-Wright | G08G 5/53 701/3 |
| 2011/0270470 | A1* | 11/2011 | Svoboda | G05D 1/0607 701/3 |
| 2016/0069688 | A1* | 3/2016 | Polansky | G08G 5/53 701/3 |
| 2017/0132938 | A1* | 5/2017 | Lax | G05B 17/02 |
| 2017/0197727 | A1 | 7/2017 | Kim | |
| 2017/0249849 | A1* | 8/2017 | De Prins | G01C 23/005 |
| 2019/0033853 | A1* | 1/2019 | O'Laughlin | G08G 5/53 |
| 2020/0234602 | A1 | 7/2020 | Irrgang | |
| 2020/0290742 | A1* | 9/2020 | Kumar | B64D 27/35 |
| 2025/0083832 | A1* | 3/2025 | Piradi | G05D 1/65 |

OTHER PUBLICATIONS

Trajectory-Oriented Operations with Limited Delegation: An Evolutionary Path to NAS Modernization. Thomas Prevot and Todd Callantine. San Jose State University/NASA Ames Research Center.
Effect of Ambient Temperature Variations on the Direct Operating Cost of a Domestic Flight, Journal of Aeronautics and Space Technologies 2019.

* cited by examiner

SYSTEMS AND METHODS FOR INCREASING FUEL EFFICIENCY FOR AN AIRCRAFT

FIELD OF THE DISCLOSURE

Examples of the present disclosure generally relate to systems and methods for increasing fuel efficiency of an aircraft.

BACKGROUND OF THE DISCLOSURE

Aircraft are used to transport passengers and cargo between various locations. Numerous aircraft depart from and arrive at a typical airport every day.

As can be appreciated, when operating an aircraft, it is desirable to reduce fuel costs. Fuel economy for an aircraft relates to a measure of energy efficiency of flight operations. Fuel typically represents a substantial portion of operating cost for an aircraft. Indeed, fuel cost can account for 70% of the total cost of flight operations. Accordingly, the higher the fuel consumption of the flight, the greater the total cost incurred by an operator. As such, airlines seek to strike a balance between flight time and fuel economy. Further, fuel consumption of an aircraft varies based on certain factors, such as the number of hours the aircraft has flown, the age and condition of the engines mounted in the aircraft, and the like. In general, older aircraft having older engines may consume more fuel than newer aircraft.

SUMMARY OF THE DISCLOSURE

A need exists for a system and a method for increasing fuel efficiency of aircraft during flight. Further, a need exists for a system and a method for improving operational efficiency of aircraft.

With those needs in mind, certain examples of the present disclosure provide a system including a control unit configured to: receive data regarding an aircraft; and determine, based on the data, one or more economy speeds (or an economy speed range/band) for the aircraft to fly between a departure airport and an arrival airport.

In at least one example, the one or more economy speeds (or economy speed range/band) include a maximum economy speed, and a minimum economy speed.

In at least one example, the data includes one or more of: performance data including information regarding operational capabilities of the aircraft, navigation data including information related to navigation of the aircraft at or otherwise in relation to one or more locations, tracking data including information regarding a position of the aircraft within an airspace, terrain data including information related to terrain at the one or more locations, weather data including information regarding current weather and/or forecasted weather at the one or more locations, flight plan data including information regarding one a current flight plan and/or a future flight plan for the aircraft, cost index data including information regarding a predetermined cost index for one or more flights of the aircraft, or gross weight data including information about or otherwise regarding a gross weight of the aircraft. For example, the data can include all of the performance data, the navigation data, the tracking data (which can include air traffic data), the terrain data, the weather data, the flight plan data, the cost index data, and the gross weight data.

In at least one example, the system also includes a user interface including a display. The control unit is in communication with the user interface. The control unit is further configured to show the one more economy speeds on the display. For example, the control unit can be further configured to show an economy speed graphic on the display. As a further example, the control unit can be configured to show indicia on or within the economy speed graphic indicating that the aircraft is flying at the one or more economy speeds (such as within an economy speed band). The control unit can be further configured to show, on the display, one or both of time saved or fuel saved from flying at the one or more economy speeds (such as within an economy speed band).

In at least one example, the control unit is further configured to determine the one or more economy speeds in response to selection of an economy speed mode.

In at least one example, the control unit is configured to determine the one or more economy speeds based on a cost index and a penalty factor.

The control unit can be further configured to automatically operate the aircraft based on the one or more economy speeds.

The control unit can be an artificial intelligence or machine learning system.

Certain examples of the present disclosure provide a method including receiving, by a control unit, data regarding an aircraft; and determining, by the control unit, based on the data, one or more economy speeds for the aircraft to fly between a departure airport and an arrival airport.

Certain examples of the present disclosure provide a non-transitory computer-readable storage medium comprising executable instructions that, in response to execution, cause one or more control units comprising a processor, to perform operations including receiving data regarding an aircraft; and determining, based on the data, one or more economy speeds for the aircraft to fly between a departure airport and an arrival airport.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods for increasing fuel efficiency of an aircraft during operation. In at least one example, a control unit determines an optimum economy speed range (minimum and maximum) for a flight route based on a cost index and an altitude profile. The control unit adjusts an active flight speed within a determined economy speed range, thereby optimizing fuel consumption. Based on the speed applied from the economy speed range, the control unit determines a reduction in total flight time, and fuel saved, which can be shown on a display of a user interface, such as within a cockpit or flight deck of the aircraft.

An aircraft uses a certain amount of fuel to travel from a departure airport to an arrival (or destination) airport. A goal when planning a flight is to carry an amount of fuel that results in a minimum amount of fuel (dictated by safety and/or regulatory considerations) remaining at the arrival airport. Carrying any additional fuel can be wasteful because the additional fuel increases the weight of the aircraft, and thereby increases the fuel consumption and carbon emissions of the aircraft.

Currently, a flight management system (FMS) computes current and predicted four-dimensional flight profiles (lateral and vertical) information such as fuel, time, distance, altitude and speed for each waypoint on an active flight plan. However, fuel consumption is entirely based on a speed of the aircraft and a cost index. Any change in aircraft speed has a direct impact on fuel consumption.

Figure 1:
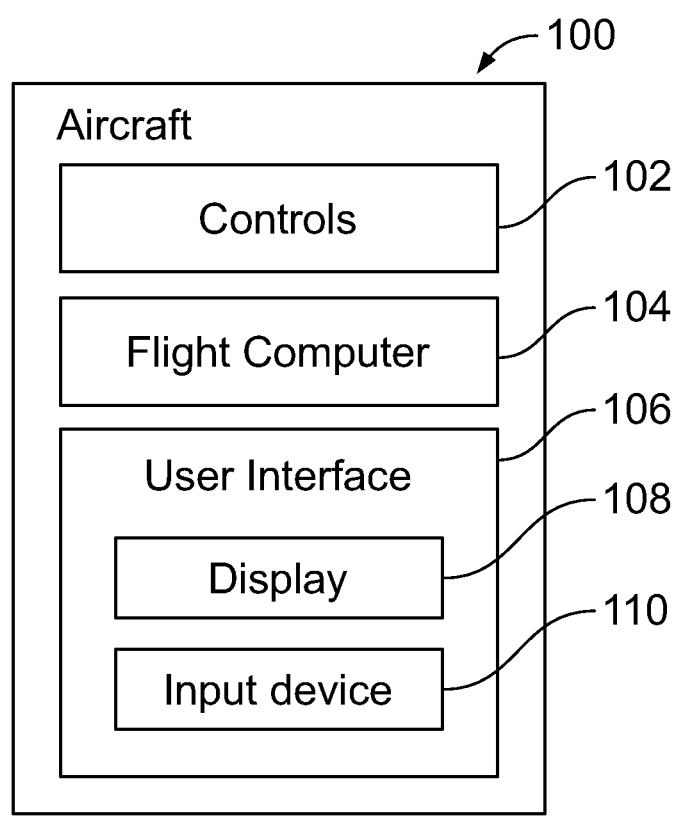
FIG. 1 illustrates a simplified block diagram of an aircraft, according to an example of the present disclosure.

FIG. 1 illustrates a simplified block diagram of an aircraft 100, according to an example of the present disclosure. The aircraft 100 includes controls 102, which are used to control operation of the aircraft 100. Examples of the controls 102 include a steering console, a yoke, a joystick, one or more brakes, buttons, dials, keys, accelerators, buttons or pedals, and/or the like.

The aircraft 100 also includes a flight computer 104, which receives data for operating the aircraft 100. The flight computer 104 typically receives data regarding a flight plan between a departure airport and an arrival or destination airport, for example. The flight computer 104 can be used to control aspects of the aircraft 100. For example, the flight computer 104 can be used to automatically control operation of the aircraft 100.

The aircraft 100 also includes a user interface 106, which includes a display 108 and an input device 110. The user interface 106 can be within a cockpit or flight deck of the aircraft 100. The user interface 106 can be used by a pilot to monitor operations, control operations, review information, and/or the like. In at least one example, the display 108 is an electronic monitor, television, and/or the like, and the input device 110 includes one or more of a keyboard, a mouse, a stylus, and/or the like. In at least one example, the display 108 and the input device 110 are integrated as a touchscreen interface. In at least one example, the user interface 106 is a computer workstation. For example, the user interface 106 can be part of the flight computer 104. As another example, the user interface 106 is a handheld device, such as a smartphone, smart tablet, or the like.

Figure 2:
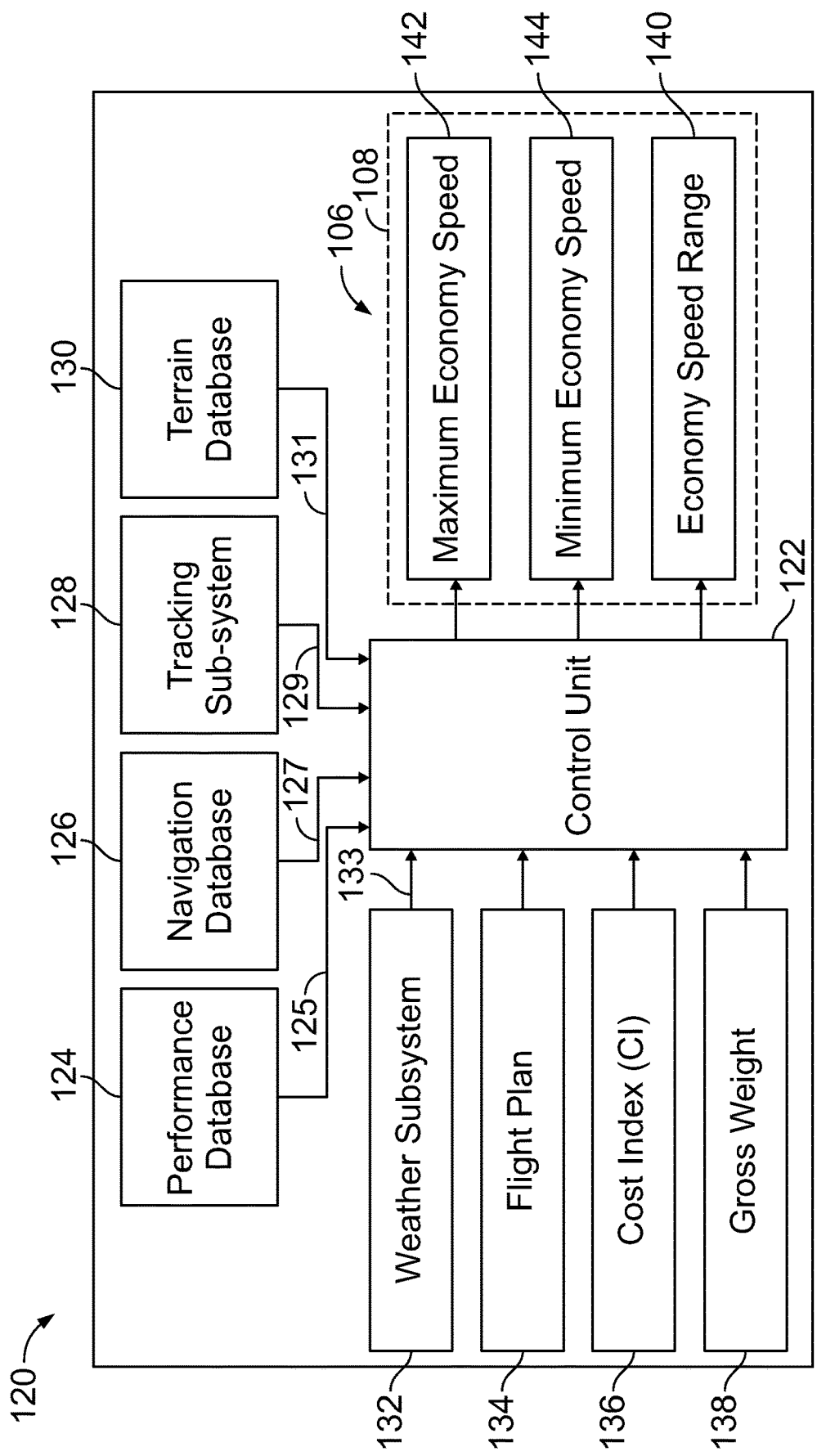
FIG. 2 illustrates a schematic block diagram of a system for increasing fuel efficiency of an aircraft, according to an example of the present disclosure.

FIG. 2 illustrates a schematic block diagram of a system 120 for increasing fuel efficiency of an aircraft, according to an example of the present disclosure. Referring to FIGS. 1 and 2, the system 120 includes a control unit 122 in communication with the user interface 106, such as through one or more wired or wireless connections. In at least one example, the control unit 122 is onboard the aircraft 100. For example, the control unit 122 can be part of the flight computer 104. In at least one example, the control unit 122 is part of a flight management system. Optionally, the control unit 122 can be separate and distinct from the flight computer 104. As another example, the control unit 122 can be remote from the aircraft 100. In such an example, the control unit 122 can be at a separate location, and in communication with the aircraft 100 through one or more antennas, radios, transceivers, and/or the like.

The control unit 122 is also in communication with a performance database 124, such as through one or more wired or wireless connections. In at least one example, the performance database 124 is onboard the aircraft 100. For example, the performance database 124 can be part of the flight computer 104. Optionally, the performance database 124 can be separate and distinct from the flight computer 104. As another example, the performance database 124 can be remote from the aircraft 100. In such an example, the performance database 124 can be at a separate location, and in communication with the aircraft 100 through one or more antennas, radios, transceivers, and/or the like.

The performance database 124 stores performance data for the aircraft 100. The performance data includes information regarding operational capabilities of the aircraft 100. For example, the performance data includes information regarding how much fuel the aircraft 100 having a particular weight will burn at a particular airspeed, at a particular altitude, for a particular period of time, etc. In at least one example, the performance data includes one or more performance models for the aircraft 100. The performance models for the aircraft can be predetermined and stored in a memory. The performance models can include generic performance models for a type, class, or family of aircraft. As an example, a generic performance model for a particular type of aircraft, such as a Boeing 737, can be determined upon the aircraft 100 being manufactured. The performance data can also be based on the generic performance model and historical data for the specific aircraft 100. Optionally, the system 120 may not include the performance database 124.

The control unit 122 is also in communication with a navigation database 126, such as through one or more wired or wireless connections. In at least one example, the navigation database 126 is onboard the aircraft 100. For example, the navigation database 126 can be part of the flight computer 104. Optionally, the navigation database 126 can be separate and distinct from the flight computer 104. As another example, the navigation database 126 can be remote from the aircraft 100. In such an example, the navigation database 126 can be at a separate location, and in communication with the aircraft 100 through one or more antennas, radios, transceivers, and/or the like. The navigation database 126 stores information related to navigation of the aircraft 100 between different locations. Optionally, the system 120 may not include the navigation database 126.

The control unit 122 is also in communication with a tracking sub-system 128 (such as may be or otherwise include an air traffic information system), such as through one or more wired or wireless connections. The tracking sub-system 128 can be remotely located from the control unit 122. The tracking sub-system 128 is configured to track real time data of the aircraft 100, such as positions of the aircraft 100 within an airspace. For example, the aircraft 100 include one or more position sensors that are detected and tracked by the tracking sub-system 128. The tracking sub-system 128 can be a radar sub-system. As another example, the tracking sub-system 128 can be an automatic dependent surveillance-broadcast (ADS-B) sub-system. Optionally, the system 120 may not include the tracking sub-system 128.

In at least one example, the position sensor can be an ADS-B transmitter configured to output an ADS-B OUT signal. The ADS-B OUT signal provides information regarding the aircraft 100 within an airspace. For example, the ADS-B OUT signal provides position, heading, speed, altitude, and the like for the aircraft 100. The tracking sub-system 128 is configured to receive the ADS-B OUT signals from the aircraft 100. For example, the tracking sub-system 128 includes an ADS-B receiver that is configured to receive the ADS-B OUT signals from the aircraft 100. In this example, the tracking sub-system 128 is an ADS-B tracking sub-system that determines a current position of an aircraft 100 via satellite navigation through a positional signal (that is, the ADS-B OUT signal) of the aircraft 100 output by the ADS-B transmitter. As another example, the tracking sub-system 128 can be a global positioning system.

The control unit 122 is also in communication with a terrain database 130, such as through one or more wired or wireless connections. In at least one example, the terrain database 130 is onboard the aircraft 100. For example, the terrain database 130 can be part of the flight computer 104. Optionally, the terrain database 130 can be separate and distinct from the flight computer 104. As another example, the terrain database 130 can be remote from the aircraft 100. In such an example, the terrain database 130 can be at a separate location, and in communication with the aircraft 100 through one or more antennas, radios, transceivers, and/or the like. The terrain database 130 stores information related to terrain (such as landmarks, obstacles, buildings, features, and the like) of land at and between various locations. Optionally, the system 120 may not include the terrain database 130.

The control unit 122 is also in communication with a weather sub-system 132, such as through a wireless connections. For example, the control unit 122 can be in communication with the weather sub-system 132 through one or more antennas, radios, transceivers, and/or the like. The weather sub-system 132 can be or otherwise include a weather forecasting service, for example. As another example, the weather sub-system can be or otherwise include Meteorological Aerodrome Reports (METAR) communication service. A METAR provides an observation of current surface weather at an airport. As another example, the weather sub-system can be or otherwise include a Terminal Aerodrome (TAF) communication service. A TAF provides a forecast of future weather at an airport. The weather sub-system 132 provides weather data to the control unit 122. The weather data includes information regarding current and forecasted weather at various locations, such as current and future locations of the aircraft 100.

The control unit 122 also receives flight plan data 134, such as from an aircraft operator. The flight plan data 134 includes information regarding a current and/or a future flight plan for the aircraft 100.

The control unit 122 also receives cost index data 136, such as from an aircraft operator, a manufacturer, and/or the like. The cost index data 136 includes information regarding a predetermined cost index for one or more flights of the aircraft 100. The cost index is a numerical value used to balance fuel costs against time savings. The cost index represents the relative efficiency of flying faster or slower at a given time. A higher cost index favors faster flights, while a lower cost index favors fuel-efficient, slower flights. The cost index helps operators make decisions about optimal flight speeds based on fuel prices and other operational factors.

The control unit 122 also receives gross weight data 138, such as from an aircraft operator, a manufacturer, and/or the like. The gross weight data 138 includes information regarding a gross weight of the aircraft 100. The gross weight can be a current gross weight, a predicted gross weight, and/or a previous gross weight of the aircraft 100.

In operation, the control unit 122 determines an economy speed range 140 for the aircraft 100 based on one or more of the performance data 125 received from performance database 124, navigation data 127 received from the navigation database 126, tracking data 129 received from the tracking sub-system 128, terrain data 131 received from the terrain database 130, weather data 133 received from the weather sub-system 132, flight plan data 134, cost index data 136, and/or gross weight data 138. In at least one example, the control unit 122 determines the economy speed range 140 for the aircraft 100 based on the performance data 125, the navigation data 127, the tracking data 129, the terrain data 131, the weather data 133, the flight plan data 134, the cost index data 136, and the gross weight data 138.

The economy speed range 140 is a range of airspeeds within which the aircraft 100 can fly that increases fuel efficiency. The increased fuel efficiency balances a reduced amount of fuel burn with an acceptable flight time, for example. The economy speed range 140 includes a maximum economy speed 142 and a minimum economy speed 144. The economy speed range 140 includes the maximum economy speed 142, the minimum economy speed 144, and the speeds therebetween. The control unit 122 shows the economy speed range 140 on the display 108 of the user interface 106, for example.

In at least one example, the control unit 122 determines economy speed limits for an active flight plan, such as included in the flight plan data 134. The economy speed limits include the maximum economy speed 142 and the minimum economy speed 144. The economy speed limits represent optimized fuel consumption accuracy relative to a predicted time of arrival. In at least one example, the economy speed limits that provide the bounds of the economy speed range 140 are the maximum economy speed 142 and the minimum economy speed 144, which provide a furthest distance traveled for a given amount of fuel burned and a minimum fuel burned for a given flight distance traveled. In at least one example, the control unit 122 determines the economy speed range 140, including the maximum economy speed 142 and the minimum economy speed 144, for one or more phases of flight, such as climb, cruise and descent phases.

In at least one example, in response to a pilot selecting an economy speed mode via the user interface 106 (such as through the input device 110), the control unit 122 determines the economy speed range 140 for the aircraft 100. In at least one example, the control unit 122 determines the economy speed range 140, including the maximum economy speed 142 and the minimum economy speed, based on the cost index, and a penalty factor, each of which can be predetermined. For example, the control unit 122 determines the maximum economy speed 142 and the minimum economy speed 144 by calculating a fuel mileage for a specific cost index along a MACH number (the highest fuel milage is computed as Minimum Economy Speed), and then calculates a next set of economy speed based on a penalty factor on fuel mileage (which is the maximum economy speed). In at least one example, the penalty factor varies from 1% to 5% based on the performance data 125, such as the age and number of hours the aircraft 100 has flown, a type of engine used by the aircraft 100, and/or maintenance history of the aircraft 100. In at least one example, the penalty factor is also based on route and tail of the aircraft 100 in flight, the cost index, a cruise altitude, and/or gross weight of the aircraft 100.

In at least one example, after the control unit 122 determines the maximum economy speed 142 and the minimum economy speed 144, the aircraft 100 can be automatically operated at an airspeed within the economy speed range 140, such as at and/or between the maximum economy speed 142 and the minimum economy speed 144. For example, a pilot can select the maximum economy speed 142, the minimum economy speed 144, or a speed therebetween, and the control unit 122 can automatically operate the aircraft 100 (such as through automatic operation of one or more of the controls 102) at the selected speed. Optionally, the control unit 122 may not automatically operate the aircraft 100.

As described herein, the system 120 includes the control unit 122, which is configured to receive data regarding the aircraft 100, and determine, based on the data, one or more economy speeds for the aircraft 100 to fly between a departure airport and an arrival airport. In at least one example, the economy speeds include the maximum economy speed 142, and the minimum economy speed 144. In at least one example, the data includes performance data, navigation data, tracking data, terrain data, weather data, flight plan data, cost index data, and/or gross weight data.

Figure 3:
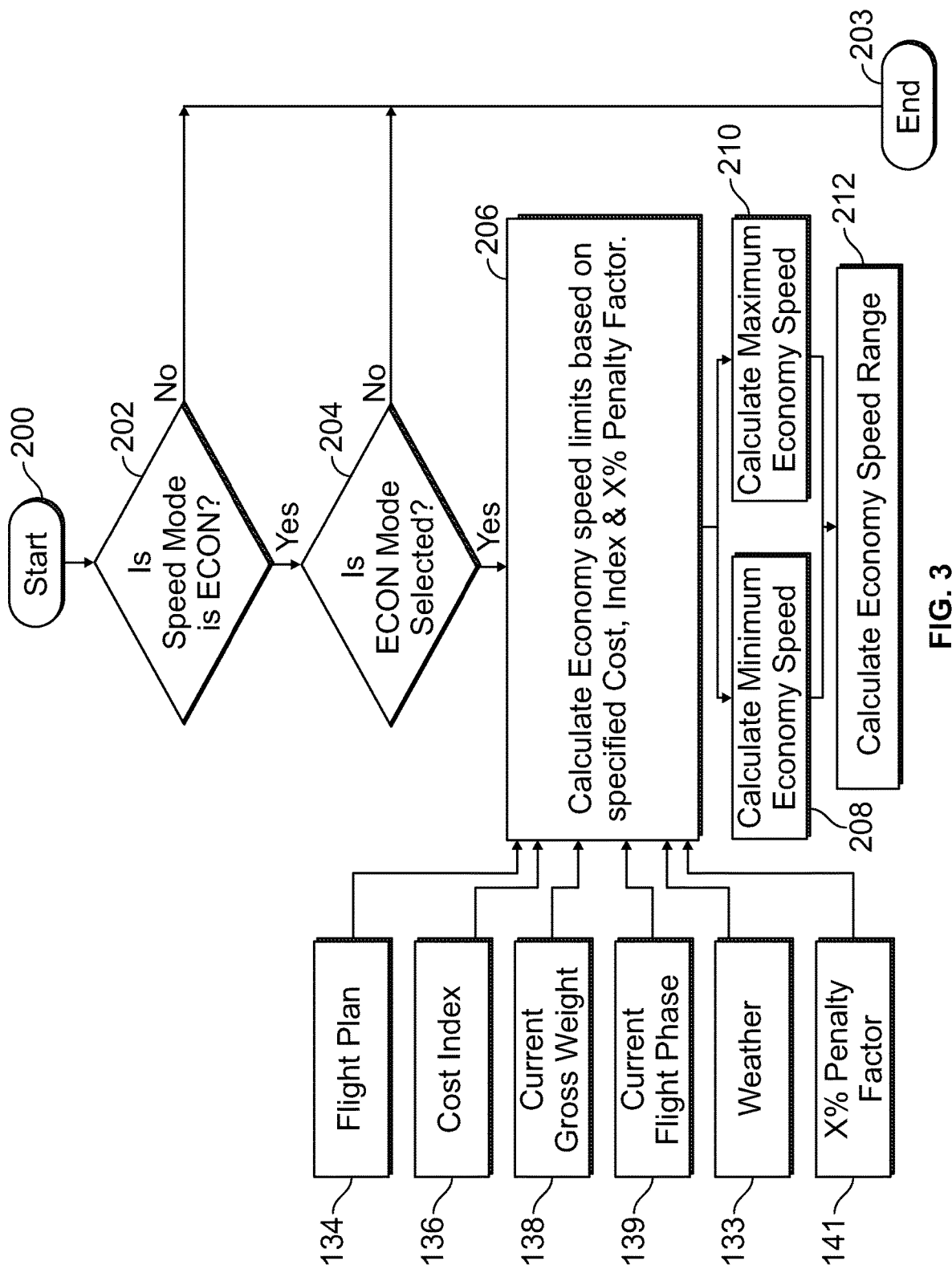
FIG. 3 illustrates a flow chart of a method, according to an example of the present disclosure.

FIG. 3 illustrates a flow chart of a method, according to an example of the present disclosure. Referring to FIGS. 1-3, the method starts at 200. At 202, the control unit 122 determines if an economy speed mode has been selected (such as by a pilot of the aircraft 100). If not, the method ends at 203.

If the economy speed mode has been selected at 202, the method proceeds to 204, at which the control unit 122 determines if an economy range mode (including an economy distance) has been selected (such as by the pilot of the aircraft 100). The economy distance is the distance that can be traveled by the aircraft 100 if flown at an economy speed, such as the maximum economy speed 142, the minimum economy speed 144, or one or more speeds therebetween. If the economy distance has not been selected, the method ends at 203.

If, however, the economy distance has been selected at 204, at 206 the control unit 122 calculates or otherwise determines the economy speed limits (such as the maximum economy speed 142 and the minimum economy speed 144) based on a cost index and penalty factor. For example, the control unit 122 determines the economy speed limits based on the flight plan 134 for the aircraft 100, the predetermined cost index 136, the current gross weight 138 of the aircraft 100, a current flight phase 139 of the aircraft 100, weather data 133 (such as current weather or predicted forecast weather at one or more locations of the aircraft 100), and the penalty factor 141. In determining the economy speed limits, the control unit 122 determines the minimum economy speed 144 at 208, and the maximum economy speed 142 at 210. Next, at 212, the control unit 122 calculates or otherwise determines the economy speed range (or distance) 212. The economy speed distance 212 is the distance to be traveled by the aircraft 100 when flown at a speed within the economy speed range 140.

After determining the economy speed limits and the economy speed distance, the control unit 122 can also show an economy speed graphic (such as a band, header, or the like) based on the determined maximum economy speed and the minimum economy speed, on the display 108. The economy speed graphic can be shown through indicia, such as a particular color, brackets, lines, bars, gauges, and/or the like. In response to the aircraft being flown within the economy speed limits, the control unit 122 may further provide an indicia (such as with a highlighted notation, a color coding, and/or the like) within the economy speed graphic indicating that the aircraft 100 is flying at an economy speed.

The control unit 122 can further determine an estimated time of arrival (ETA) for the aircraft 100 flying at an economy airspeed. The control unit 122 can show the ETA on the display 108, such as at various waypoints along a flight plan.

The control unit 122 can also determine time and/or fuel that can be saved by flying the aircraft 100 at an economy airspeed (as juxtaposed with an airspeed outside of the economy speed range 140). The control unit 122 can show the time and/or fuel saved on the display 108.

In at least one example, various types of information can be shown on the display. For example, information can be shown based on feature checks. As an example, an economy speed band can be shown. The economy speed band can be based on calculated maximum and minimum speed. As another example, an economy speed range or distance can also be shown. An estimated time of arrival (ETA) can also be shown. A maximum time that can be saved (for any speed within an ETA window) can also be shown. The various different aspects or features can be shown in different colors, for example, to provide quick and easy discernment to an individual.

Figure 4:
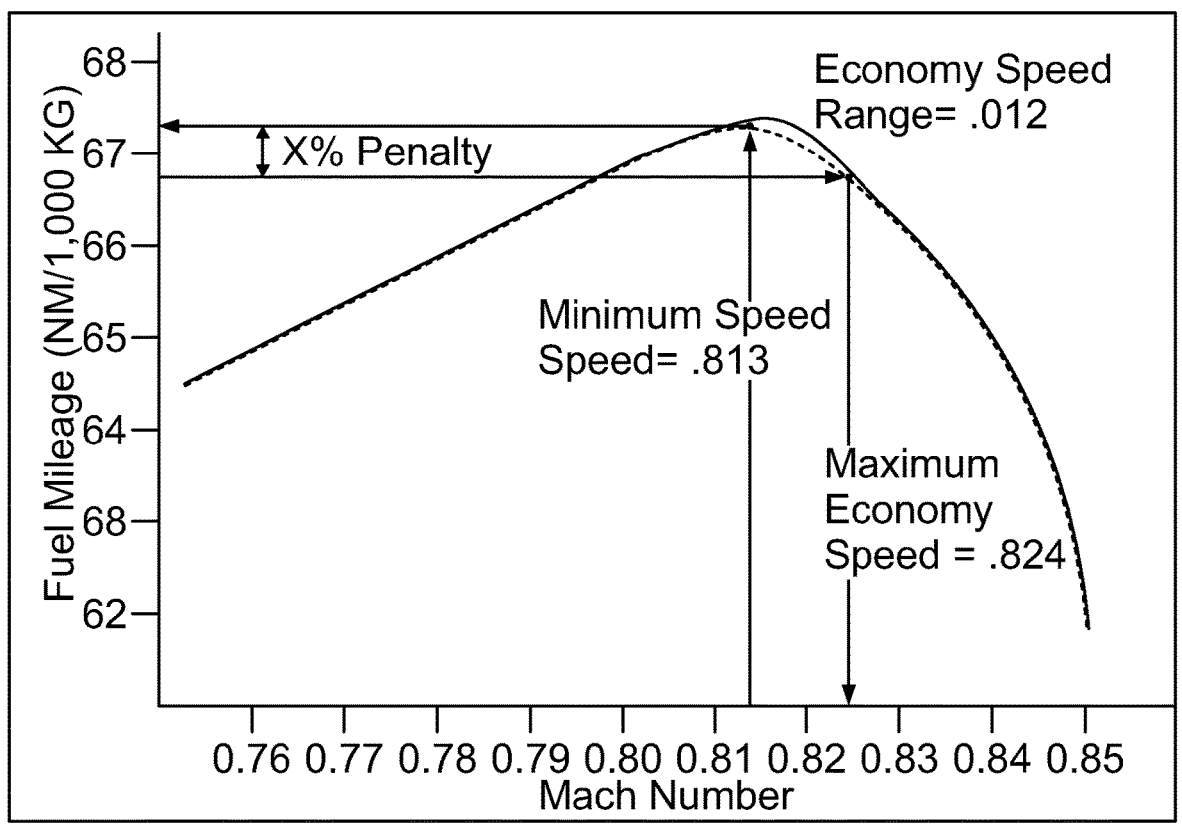
FIG. 4 illustrates a graph of airspeed in relation to fuel mileage, according to an example of the present disclosure.

FIG. 4 illustrates a graph of airspeed (in MACH number) in relation to fuel mileage, according to an example of the present disclosure. Referring to FIGS. 1-4, the control unit 122 determines a minimum economy speed (as an example, MACH 0.813), and a maximum economy speed (as an example, MACH 0.824), and the economy speed range that includes the minimum economy speed, the maximum economy speed, and speeds therebetween (in this example, MACH 0.012). It is to be understood that FIG. 4 shows non-limiting examples of the economy speeds.

As shown, in at least one example, the control unit 122 determines the economy speeds (including the maximum economy speed and the minimum economy speed) by assessing the fuel mileage for a specific cost index along the MACH number. The control unit 122 computes the highest fuel milage as the minimum economy speed, and the determines a next set economy speed based on the penalty factor (for example X % penalty) on the fuel mileage, thereby determining the maximum economy speed.

Figure 5:
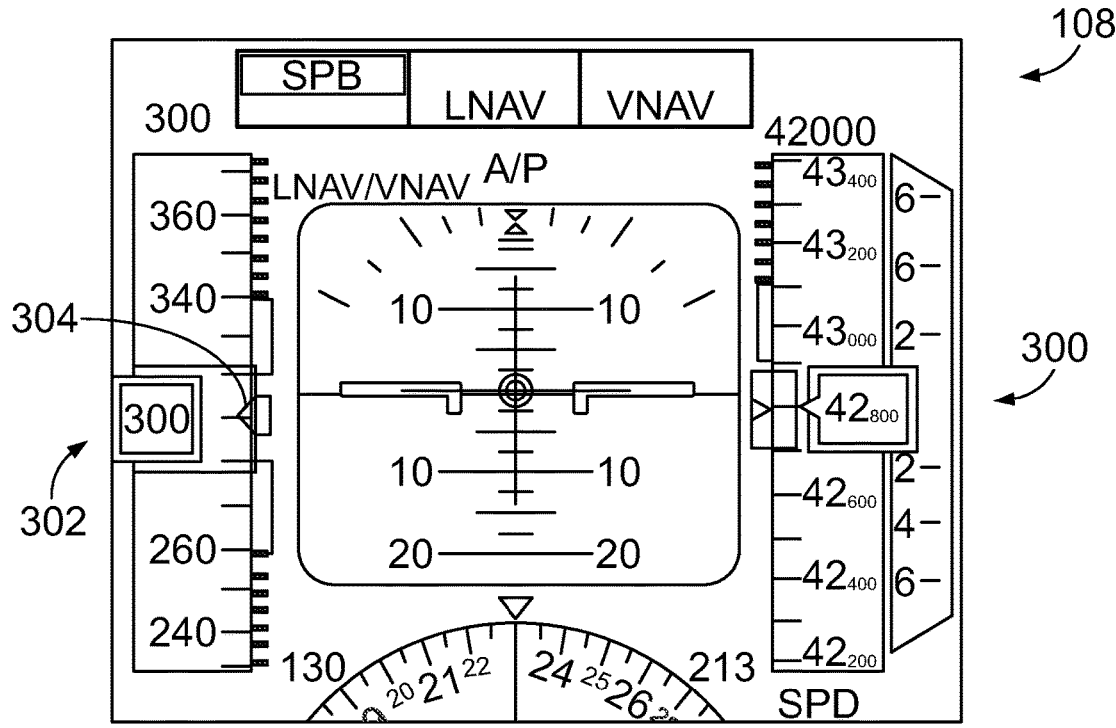
FIG. 5 illustrates a front view of a display of an aircraft, according to an example of the present disclosure.

FIG. 5 illustrates a front view of a display 108 of an aircraft, according to an example of the present disclosure. Referring to FIGS. 1, 2, and 5, the control unit 122 can operate the display 108 to allow for selection between different modes. For example, a user can select a primary flight display 300 to be shown on the display 108. FIG. 5 shows an example of the primary flight display 300. In the primary flight display 300, the control unit 122 can then show an economy speed graphic 302 on the primary flight display 300. For example, the economy speed graphic 302 can be a band, which can include a highlighted area 304 representing the economy speed range 140. The highlighted area 304 can be color coded, for example. The highlighted area 304 can be a first color before the economy speed mode is selected by a pilot, and a second color that differs from the first color after the economy speed mode is selected.

Figure 6:
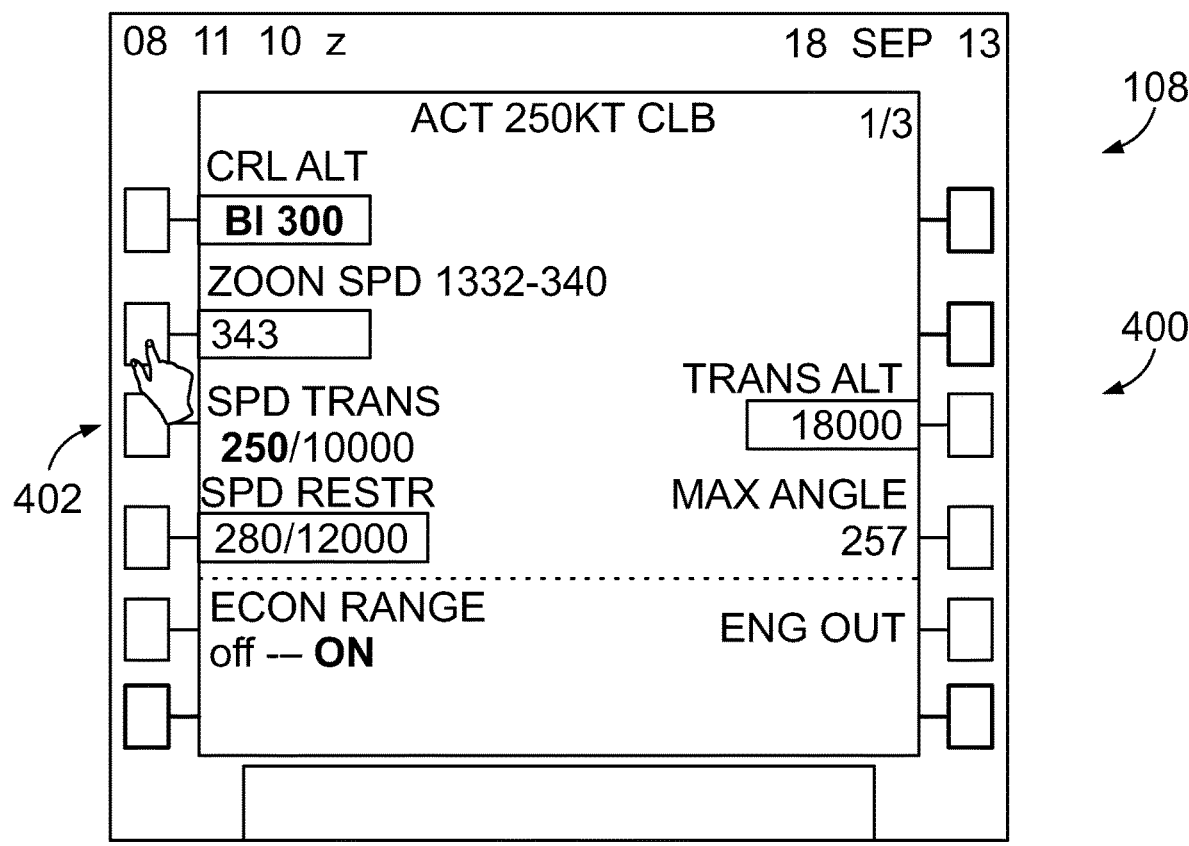
FIG. 6 illustrates a front view of a display showing an economy speed band, according to an example of the present disclosure.

FIG. 6 illustrates a front view of a display 108 showing an economy speed band, according to an example of the present disclosure. Referring to FIGS. 1, 2, and 6, the control unit 122 can operate the display 108 to allow for selection between different modes. For example, a user can select a vertical navigation (VNAV) Climb Page 400, which can show the economy speed range 140, such as in distinct color in a header 402. It is to be understood that the speeds and ranges shown in FIG. 6 are non-limiting examples. Economy speed modes can be selected for various different phases of flight, such as climb, cruise, and descent.

The control unit 122 can indicate such different phases on the display 108, and the economy speed ranges therein via different indicia, such as different colors, graphics, text, and/or the like. The control unit 122 can also operate the display 108 to show ETAs for a flight plan in which the aircraft 100 flies at an economy speed, such as with respect to a destination, one or more waypoints, and/or the like. The control unit 122 can also operate the display 108 to show time and fuel saved by the aircraft 100 flying at an economy speed.

Figure 7:
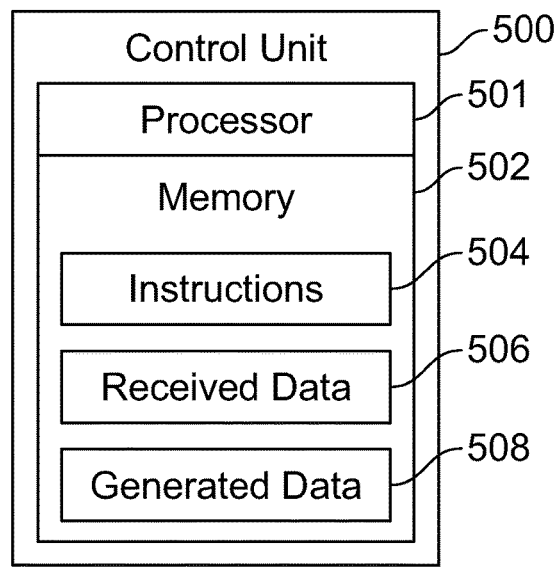
FIG. 7 illustrates a schematic block diagram of a control unit, according to an example of the present disclosure.

FIG. 7 illustrates a schematic block diagram of a control unit 500, according to an example of the present disclosure. The control unit 122 shown in FIG. 2 can be configured as the control unit 500. In at least one example, the control unit 500 includes at least one processor 501 in communication with a memory 502. The memory 502 stores instructions 504, received data 506, and generated data 508. The control unit 500 shown in FIG. 7 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 122 may be or include one or more processors that are configured to control operation, as described herein.

The control unit 122 is configured to execute a set of instructions that are stored in one or more data storage units or elements (such as one or more memories), in order to process data. For example, the control unit 122 may include or be coupled to one or more memories. The data storage units may also store data or other information as desired or needed. The data storage units may be in the form of an information source or a physical memory element within a processing machine.

The set of instructions may include various commands that instruct the control unit 122 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 122. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 122 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-7, examples of the subject disclosure provide systems and methods that allow large amounts of data to be quickly and efficiently analyzed by a computing device. For example, the control unit 122 can analyze various aspects of aircraft 100, air traffic, flight plans, cost indices, and/or the like. As such, large amounts of data, which may not be discernable by human beings, are being tracked and analyzed. The vast amounts of data are efficiently organized and/or analyzed by the control unit 122, as described herein. The control unit 122 analyzes the data in a relatively short time in order to quickly and efficiently determine economy speeds. A human being would be incapable of efficiently analyzing such vast amounts of data in such a short time. As such, examples of the present disclosure provide increased and efficient functionality, and vastly superior performance in relation to a human being analyzing the vast amounts of data.

In at least one example, components of the system 120, such as the control unit 122, provide and/or enable a computer system to operate as a special computer system for automatically determining economy speeds. The control unit 122 improves upon standard computing devices by determining such information in an efficient and effective manner.

In at least one example, all or part of the systems and methods described herein may be or otherwise include an artificial intelligence (AI) or machine-learning system that can automatically perform the operations of the methods also described herein. For example, the control unit 122 can be an artificial intelligence or machine learning system. These types of systems may be trained from outside information and/or self-trained to repeatedly improve the accuracy with how data is analyzed to automatically determine economy speeds. Over time, these systems can improve by determining such information with increasing accuracy and speed, thereby significantly reducing the likelihood of any potential errors. For example, the AI or machine-learning systems can learn and determine the performance capabilities of aircraft, traffic at airports, and the like, and automatically determine economy speeds for aircraft. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination of economy speeds. The training minimizes conflicts and interference by performing an iterative training algorithm, in which the systems are retrained with an updated set of data (for example, data received before, during, and/or after each flight of the aircraft 100) and based on the feedback examined prior to the most recent training of the systems. This provides a robust analysis model that can better determine situational information in a cost effective and efficient manner.

Figure 8:
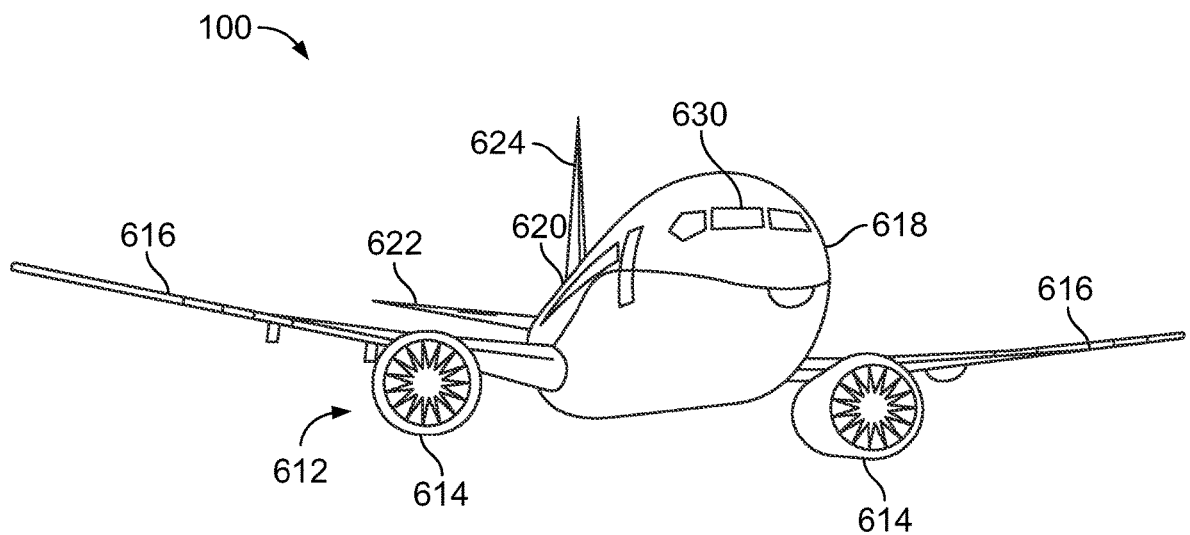
FIG. 8 illustrates a perspective front view of an aircraft, according to an example of the present disclosure.

FIG. 8 illustrates a perspective front view of an aircraft 100, according to an example of the present disclosure. The aircraft 100 includes a propulsion system 612 that includes engines 614, for example. Optionally, the propulsion system 612 may include more engines 614 than shown. The engines 614 are carried by wings 616 of the aircraft 100. In other examples, the engines 614 may be carried by a fuselage 618 and/or an empennage 620. The empennage 620 may also support horizontal stabilizers 622 and a vertical stabilizer 624. The fuselage 618 of the aircraft 100 defines an internal cabin 630, which includes a flight deck or cockpit, one or more work sections (for example, galleys, personnel carry-on baggage areas, and the like), one or more passenger sections (for example, first class, business class, and coach sections), one or more lavatories, and/or the like. FIG. 8 shows an example of an aircraft 100. It is to be understood that the aircraft 100 can be sized, shaped, and configured differently than shown in FIG. 8.

Further, the disclosure comprises examples according to the following clauses:

Clause 1. A system comprising:
a control unit configured to:
receive data regarding an aircraft; and
determine, based on the data, one or more economy speeds for the aircraft to fly between a departure airport and an arrival airport.

Clause 2. The system of Clause 1, wherein the one or more economy speeds comprise a maximum economy speed, and a minimum economy speed.

Clause 3. The system of Clauses 1 or 2, wherein the data comprises one or more of:
performance data including information regarding operational capabilities of the aircraft,
navigation data including information related to navigation of the aircraft in relation to one or more locations,
tracking data including information regarding a position of the aircraft within an airspace,
terrain data including information related to terrain at the one or more locations,
weather data including information regarding one or both of current weather or forecasted weather at the one or more locations,
flight plan data including information regarding one or both of a current flight plan or a future flight plan for the aircraft,
cost index data including information regarding a predetermined cost index for one or more flights of the aircraft, or
gross weight data including information regarding a gross weight of the aircraft.

Clause 4. The system of Clause 3, wherein the data comprises the performance data, the navigation data, the tracking data, the terrain data, the weather data, the flight plan data, the cost index data, and the gross weight data.

Clause 5. The system of any of Clauses 1-4, further comprising a user interface including a display, wherein the control unit is in communication with the user interface, and wherein the control unit is further configured to show the one more economy speeds on the display.

Clause 6. The system of Clause 5, wherein the control unit is further configured to show an economy speed graphic on the display.

Clause 7. The system of Clause 6, wherein the control unit is further configured to show indicia on or within the economy speed graphic indicating that the aircraft is flying at the one or more economy speeds.

Clause 8. The system of any of Clauses 5-7, wherein the control unit is further configured to show, on the display, one or both of time saved or fuel saved from flying at the one or more economy speeds.

Clause 9. The system of any of Clauses 1-8, wherein the control unit is further configured to determine the one or more economy speeds in response to selection of an economy speed mode.

Clause 10. The system of any of Clauses 1-9, wherein the control unit is configured to determine the one or more economy speeds based on a cost index and a penalty factor.

Clause 11. The system of any of Clauses 1-10, wherein the control unit is further configured to automatically operate the aircraft based on the one or more economy speeds.

Clause 12. The system of any of Clauses 1-11, wherein the control unit is an artificial intelligence or machine learning system.

Clause 13. A method comprising: receiving, by a control unit, data regarding an aircraft; and determining, by the control unit, based on the data, one or more economy speeds for the aircraft to fly between a departure airport and an arrival airport.

Clause 14. The method of Clause 13, wherein the one or more economy speeds comprise a maximum economy speed, and a minimum economy speed.

Clause 15. The method of Clauses 13 or 14, wherein the data comprises:
performance data including information regarding operational capabilities of the aircraft,
navigation data including information related to navigation of the aircraft in relation to one or more locations,
tracking data including information regarding a position of the aircraft within an airspace,
terrain data including information related to terrain at the one or more locations,
weather data including information regarding one or both of current weather or forecasted weather at the one or more locations, flight plan data including information regarding one or both of a current flight plan or a future flight plan for the aircraft, cost index data including information regarding a predetermined cost index for one or more flights of the aircraft, and gross weight data including information regarding a gross weight of the aircraft.

Clause 16. The method of any of Clauses 13-15, further comprising showing, by the control unit, the one more economy speeds on a display of the user interface.

Clause 17. The method of Clause 16, wherein said showing comprises: showing, by the control unit, an economy speed graphic on the display; and showing, by the control unit, indicia on or within the economy speed graphic indicating that the aircraft is flying at the one or more economy speeds.

Clause 18. The method of Clauses 16 or 17, wherein said showing further comprises showing, by the control unit, one or both of time saved or fuel saved from flying at the one or more economy speeds.

Clause 19. The method of any of Clauses 16-18, further comprising automatically operating the aircraft based on the one or more economy speeds.

Clause 20. A non-transitory computer-readable storage medium comprising executable instructions that, in response to execution, cause one or more control units comprising a processor, to perform operations comprising:

receiving data regarding an aircraft; and determining, based on the data, one or more economy speeds for the aircraft to fly between a departure airport and an arrival airport.

As described herein, examples of the present disclosure provide systems and methods for increasing fuel efficiency of an aircraft during flight. Further, examples of the present disclosure provide systems and methods for improving operational efficiency of aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a control unit configured to:
receive data regarding an aircraft, wherein the data comprises a cost index and a penalty factor, wherein the cost index is a numerical value used to balance fuel costs against time savings, and wherein the penalty factor is based on performance data of the aircraft, a route of the aircraft, a tail of the aircraft, a flight phase of the aircraft, and a gross weight of the aircraft; and
determine, based on the data comprising the cost index and the penalty factor, one or more economy speeds for the aircraft to fly between a departure airport and an arrival airport.

2. The system of claim 1, wherein the one or more economy speeds comprise a maximum economy speed, and a minimum economy speed.

3. The system of claim 1, wherein the data further comprises:
the performance data including information regarding operational capabilities of the aircraft, wherein the performance data is based on a generic performance model for a type of the aircraft, and historical data for the aircraft,
navigation data including information related to navigation of the aircraft in relation to one or more locations,
tracking data including information regarding a position of the aircraft within an airspace,
terrain data including information related to terrain at the one or more locations,
weather data including information regarding one or both of current weather or forecasted weather at the one or more locations,
flight plan data including information regarding one or both of a current flight plan or a future flight plan for the aircraft,
cost index data including information regarding a predetermined cost index for one or more flights of the aircraft, and gross weight data including information regarding a gross weight of the aircraft.

4. The system of claim 1, further comprising a user interface including a display, wherein the control unit is in communication with the user interface, and wherein the control unit is further configured to show the one more economy speeds on the display.

5. The system of claim 4, wherein the control unit is further configured to show an economy speed graphic on the display.

6. The system of claim 5, wherein the control unit is further configured to show indicia on or within the economy speed graphic indicating that the aircraft is flying at the one or more economy speeds.

7. The system of claim 4, wherein the control unit is further configured to show, on the display, one or both of time saved or fuel saved from flying at the one or more economy speeds.

8. The system of claim 1, wherein the control unit is further configured to determine the one or more economy speeds in response to selection of an economy mode.

9. The system of claim 1, wherein the control unit is further configured to automatically operate the aircraft based on the one or more economy speeds.

10. The system of claim 1, wherein the control unit is an artificial intelligence or machine learning system.

11. A method comprising:
receiving, by a control unit, data regarding an aircraft, wherein the data comprises a cost index and a penalty factor, wherein the cost index is a numerical value used to balance fuel costs against time savings, and wherein the penalty factor is based on performance data of the aircraft, a route of the aircraft, a tail of the aircraft, a flight phase of the aircraft, and a gross weight of the aircraft; and
determining, by the control unit, based on the data comprising the cost index and the penalty factor, one or more economy speeds for the aircraft to fly between a departure airport and an arrival airport.

12. The method of claim 11, wherein the one or more economy speeds comprise a maximum economy speed, and a minimum economy speed.

13. The method of claim 11, wherein the data comprises:
the performance data including information regarding operational capabilities of the aircraft, wherein the performance data is based on a generic performance model for a type of the aircraft, and historical data for the aircraft,
navigation data including information related to navigation of the aircraft in relation to one or more locations,
tracking data including information regarding a position of the aircraft within an airspace,
terrain data including information related to terrain at the one or more locations,
weather data including information regarding one or both of current weather or forecasted weather at the one or more locations,
flight plan data including information regarding one or both of a current flight plan or a future flight plan for the aircraft,
cost index data including information regarding a predetermined cost index for one or more flights of the aircraft, and
gross weight data including information regarding a gross weight of the aircraft.

14. The method of claim 11, further comprising showing, by the control unit, the one more economy speeds on a display of the user interface.

15. The method of claim 14, wherein said showing comprises:
showing, by the control unit, an economy speed graphic on the display; and
showing, by the control unit, indicia on or within the economy speed graphic indicating that the aircraft is flying at the one or more economy speeds.

16. The method of claim 14, wherein said showing further comprises showing, by the control unit, one or both of time saved or fuel saved from flying at the one or more economy speeds.

17. The method of claim 11, further comprising automatically operating the aircraft based on the one or more economy speeds.

18. A non-transitory computer-readable storage medium comprising executable instructions that, in response to execution, cause one or more control units comprising a processor, to perform operations comprising:
receiving data regarding an aircraft, wherein the data comprises a cost index and a penalty factor, wherein the cost index is a numerical value used to balance fuel costs against time savings, and wherein the penalty factor is based on performance data of the aircraft, a route of the aircraft, a tail of the aircraft, a flight phase of the aircraft, and a gross weight of the aircraft; and
determining, based on the data comprising the cost index and the penalty factor, one or more economy speeds for the aircraft to fly between a departure airport and an arrival airport.

19. The system of claim 2, wherein the control unit is configured to:
determine the minimum economy speed by calculating a fuel mileage for a specific cost index, wherein a highest fuel mileage us computed as the minimum economy speed, and
determine the maximum economy speed by calculating a next set of economy speed based on the penalty factor in relation to fuel mileage.

20. The method of claim 12, wherein said determining comprises:
determining the minimum economy speed by calculating a fuel mileage for a specific cost index, wherein a highest fuel mileage us computed as the minimum economy speed, and
determining the maximum economy speed by calculating a next set of economy speed based on the penalty factor in relation to fuel mileage.

* * * * *